US008925449B2

(12) United States Patent
Gambini

(10) Patent No.: US 8,925,449 B2
(45) Date of Patent: Jan. 6, 2015

(54) ROLL FOR DEVICES FOR THE TREATMENT OF RIBBON-SHAPED PAPER MATERIAL AND RELATED DEVICE

(75) Inventor: Giovanni Gambini, Pisa (IT)

(73) Assignee: Gambini International S.A., Luxembourg (LU)

( * ) Notice: Subject to any disclaimer, the term of this patent is extended or adjusted under 35 U.S.C. 154(b) by 479 days.

(21) Appl. No.: 13/412,874

(22) Filed: Mar. 6, 2012

(65) Prior Publication Data

US 2012/0227595 A1 Sep. 13, 2012

(30) Foreign Application Priority Data

Mar. 7, 2011 (IT) .............................. MI2011A0353

(51) Int. Cl.
*D21G 1/02* (2006.01)
*F16C 13/00* (2006.01)
*B31F 1/07* (2006.01)

(52) U.S. Cl.
CPC ........... *B31F 1/07* (2013.01); *B31F 2201/0753* (2013.01); *B31F 2201/0776* (2013.01)
USPC .............................. 100/172; 100/176; 492/20

(58) Field of Classification Search
CPC .............. D21G 1/02; B31F 1/07; F16C 13/00
USPC ...... 100/155 R, 156, 161, 162 R, 163 R, 164, 100/163 A, 172, 176; 425/370, 371, 373, 425/374; 162/358.1, 358.3; 492/15, 20, 26; 156/553, 555
See application file for complete search history.

(56) References Cited

U.S. PATENT DOCUMENTS

| | | | | | |
|---|---|---|---|---|---|
| 886,998 | A | | 5/1908 | Love | |
| 2,676,387 | A | * | 4/1954 | McArn | 492/15 |
| 5,753,083 | A | * | 5/1998 | Schiel et al. | 162/358.3 |
| 5,904,813 | A | * | 5/1999 | Bengtsson et al. | 162/358.3 |
| 6,158,333 | A | * | 12/2000 | Honkalampi et al. | 100/38 |

FOREIGN PATENT DOCUMENTS

| | | |
|---|---|---|
| FR | 2291402 | 6/1976 |
| GB | 1225350 | 3/1971 |
| WO | 2009010999 | 1/2009 |

* cited by examiner

*Primary Examiner* — Jimmy T Nguyen
(74) *Attorney, Agent, or Firm* — Themis Law

(57) ABSTRACT

In one embodiment, a roll for devices for the treatment of ribbon-shaped paper material includes a central shaft, on which a coaxial tubular jacket is fitted, among which two oscillating and non-rotating connection organs are positioned, the central shaft of the roll having, at opposite ends, oscillating bearings housed in a supporting structure, wherein the central shaft and jacket are both rotating and are also made torsionally integral by means of at least one flexible organ capable of transmitting a torque. In another embodiment, a device for the treatment of ribbon-like paper material includes with a pair of rolls opposed as specified above, wherein a first roll has a tubular steel jacket and a second roll has a tubular rubber jacket.

8 Claims, 4 Drawing Sheets

13
16
12
15
14
25
23
22
20,21

ROLL FOR DEVICES FOR THE TREATMENT OF RIBBON-SHAPED PAPER MATERIAL AND RELATED DEVICE

FIELD OF THE INVENTION

The present invention relates to a roll for devices for the treatment of ribbon-shaped paper material and a relative device.

BACKGROUND OF THE INVENTION

In the field of the treatment of ribbon-shaped paper material, in particular in the field of the treatment of veils of paper coupled with each other by means of a lamination operation and the application of an adhesive, rolls are envisaged which must make the processing operations uniform over the whole surface of the paper which advances longitudinally sliding on the roll.

For this purpose, current rolls generally consist of a single cylindrical body equipped with side neck-holes, on which the respective bearings are housed, which follow the rotation around the axis and the bending of the body caused by the coupling pressure. This arrangement has a serious drawback: the pressure between the coupled rolls causes them to bend and consequently the paper passing between them is not subjected to a uniform treatment and does not satisfy the high-quality requirements requested by the market.

In the field of the embossing, for example, it is known that two or more veils of paper previously embossed are joined by the application of a glue and lamination of the veils between counter-rotating rolls to obtain the final product. The embossing operation is effected by passing each veil, before being glued to the other veil, between two rolls, one rubber, the other steel incised on the surface. The incised roll, or otherwise generated, is equipped with tips or protuberances and is used for embossing the single veil of paper coupled with the rubber roll.

In these pairs of rolls, which can be called embossing units, there are the above drawbacks caused by the deformation of the rolls through which the veils to be embossed pass.

As already mentioned, in fact, in the pressurized coupling between a steel roll and a rubber roll, during the operative functioning, there is a tendency towards a bending of the rolls. As a result, the steel roll, having surface protuberances, does not correctly and uniformly incise the whole transversal development of the veil of paper. This leads to a non-uniform embossing in the transversal development, which is not adequate for the high-quality standards required by the market, specifically due to this lack of constant characteristics.

A first proposal envisages the use of rounded rubber rolls, whose rounding however is only ideal for an extremely restricted range of pressure values, outside which the positive effects of the rounded rolls is nullified. The consequent necessity of using special rolls for the various ranges, makes the solution quite impracticable due to the costs of the various rolls and costs and times necessary for the assembly and dismantling.

A further solution currently applied comprises reducing the pressure exerted by the rubber roll, obtaining however a less evident embossing, i.e. less marked, thus providing an end-product with a limited thickness, which does not meet market requirements.

An alternative solution adopts complicated mechanical arrangements, called skewing or with rolls having oblique axes, in an attempt to uniform the incision of the paper. This solution allows a decrease in the embossing value of the rubber roll. These arrangements are complex from a structural point of view of the machine and also for the user for their correct functional set-up with difficulty in aligning the paper unwound. There is also a significant production cost and a precocious and non-uniform wear of the rubber roll.

Another proposal consists in envisaging a particular arrangement which attempts to overcome the drawback of the bending of pressurized coupled rolls, as suggested in international patent application WO-A-2009/010999.

In this solution, the rolls are transformed from single rotating cylindrical bodies to a structure or arrangement consisting of a fixed central shaft (the neck-holes are wedge-inserted in flanks/arms) on which two groups of bearings of the oscillating type are assembled, at a distance shorter than the table.

This arrangement allows the rotation, around the longitudinal axis of the fixed central shaft, of a jacket that forms the surface facing the outside of the roll. This configuration in fact relieves a great deal of the bending, due to the coupling pressure between the rolls, on the fixed central shaft, thus allowing the outer jacket to remain almost parallel or with a negligible rise.

It should be pointed out that this arrangement has certain assembly difficulties due to the wedge-inserted central shaft. The bearings in this arrangement undergo excessive heating partly due to their orientable nature and stress in play. The production of this particular arrangement also requires a specific projecting, which is complex and costly, of both the rolls themselves and also the whole machine suitable for receiving the latter.

It has also been observed that the same problem is present in the rolling presses or pairs of rolls used for levelling the thickness of the paper and, more generally, in production processes which envisage the compression of a strip of paper material passing between two entrainment rolls.

SUMMARY OF THE INVENTION

A general objective of the present invention is, therefore, to solve the drawbacks of the known art described above in an extremely simple, economical and particularly functional manner.

A further objective is to obtain a marked reduction in the bending of the pressurized coupled rolls and at the same time maintain their configuration more or less similar to traditional rolls (currently on the market), thus guaranteeing their interchangeability also on pre-existing machines.

Another objective is to eliminate problems of complicated assembly and operative regulation, wear, heating, idle times.

In view of the above objectives, according to the present invention, a roll has been conceived for devices for the treatment of ribbon-shaped paper material and a relative device having the characteristics specified in the enclosed claims.

A roll and a relative device according to the present invention allow a treatment of paper to be effected from which an end-product is obtained which satisfies the highest qualitative standards.

The roll and device can generally be used in the rolling of paper or more specifically in embossing. In any case, their use is recommended in any process which envisages the compression of a strip of paper material passing between two rolls.

BRIEF DESCRIPTION OF THE DRAWINGS

The structural and functional characteristics of the present invention and its advantages with respect to the known art will appear more evident from the following description, referring to the enclosed drawings, which among other things, show an embodiment of such a roll and its application effected according to the invention itself. In the drawings.

DETAILED DESCRIPTION OF EMBODIMENTS OF THE INVENTION

With reference to the figures, these show a roll for devices for the treatment of ribbon-shaped paper material in its generality, exemplified in one of the possible embodiments in which the roll is part of an embossing device.

Figures 1, 2:
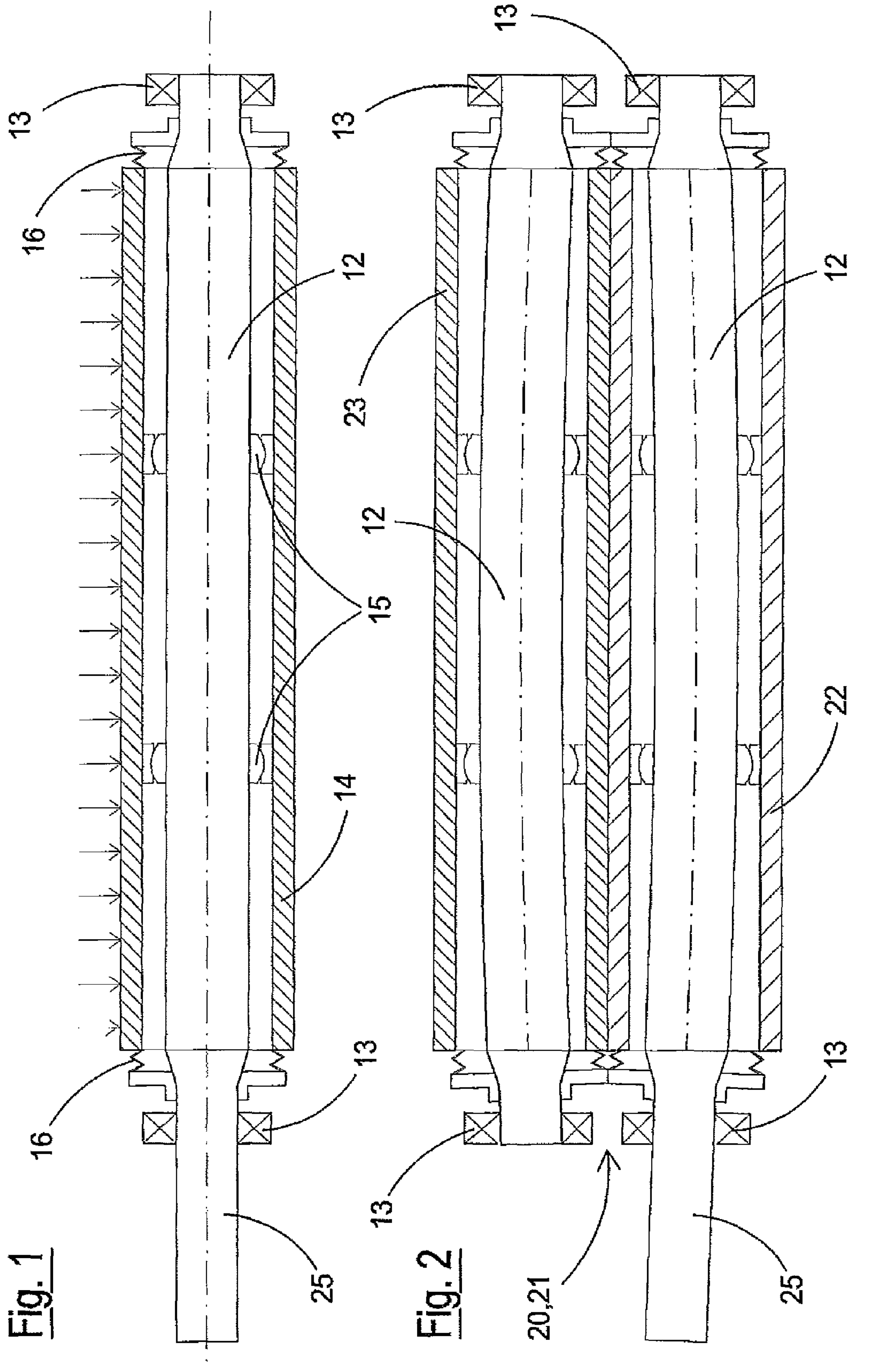
FIG. 1 shows a schematic and synthetic section of a roll according to the present invention.
FIG. 2 shows a section of a pair of rolls according to FIG. 1 forming an embossing calender with a steel roll and a rubber roll in an operating position with charged and deformed shafts.

In general, a generic roll according to the invention, such as that of FIG. 1, comprises a central shaft 12 rotating on bearings oscillating at the ends 13, housed on flanks or arms (not shown in FIG. 1), and an external tubular jacket 14 also rotating integrally with the central shaft 12 fitted thereon. The central shaft 12 is coaxial to it in a non-stressed rest position. Between the outer jacket and central shaft inside this, there are two oscillating and non-rotating connection organs 15, such as supports, situated at a distance from each other shorter than the table of the whole roll. These oscillating and non-rotating connection organs 15 allow the deformation of the shaft 12 to be compensated, without significantly involving the jacket 14, which is therefore only slightly deformed even at the highest pressures.

In the example, the central shaft 12 and tubular jacket 14 are made torsionally integral through one or more joints or flexible organs 16, capable of transmitting a torque. These joints or flexible organs 16 allow a rotational movement to be transmitted, allowing however a certain independence between the central shaft 12 and jacket 14 in the other degrees of freedom.

Figure 3:
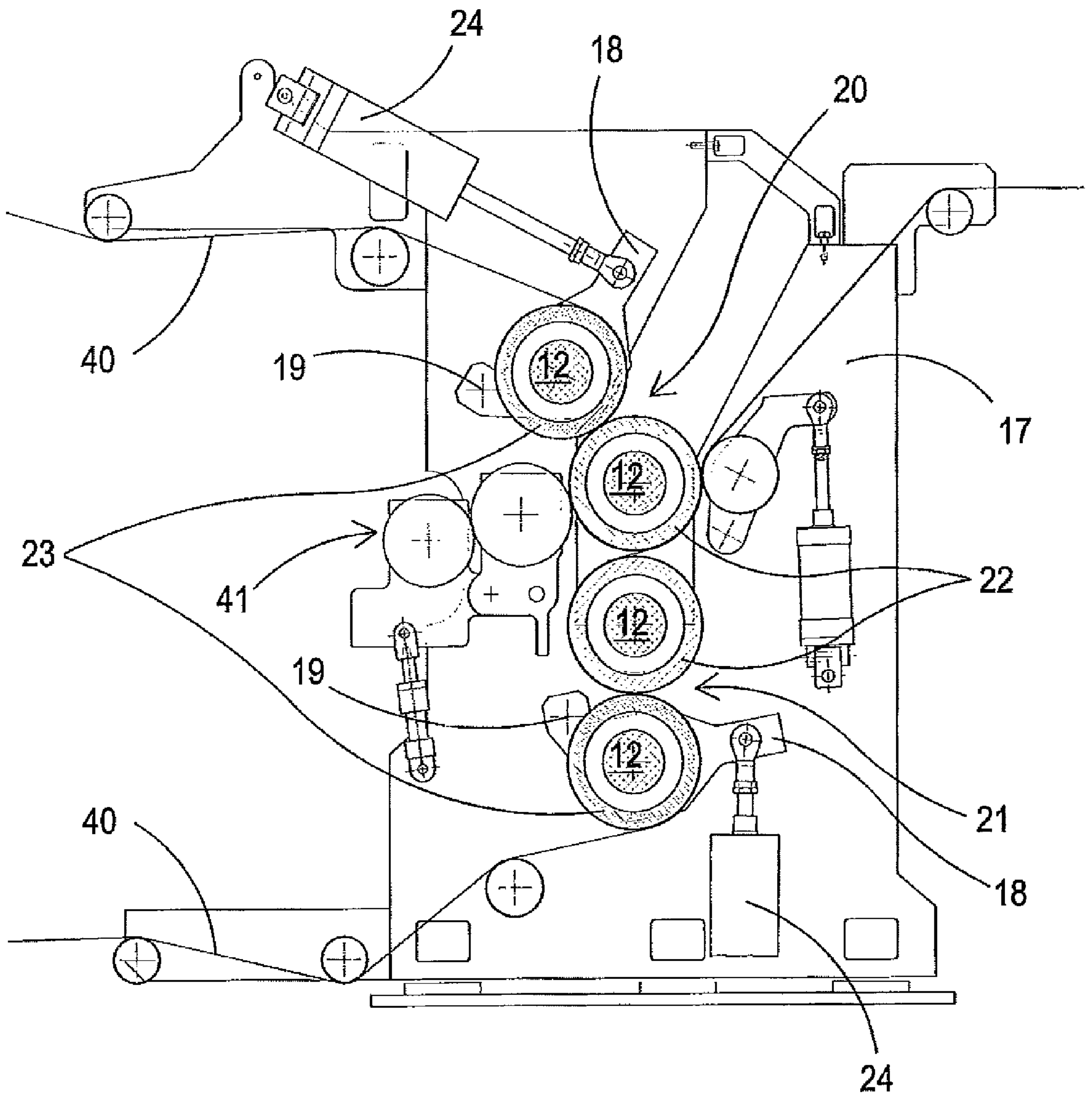
FIG. 3 shows a schematic raised side view of a shoulder of an embossing unit, with some parts omitted, equipped with rolls such as those of FIGS. 1 and 2.

FIGS. 2 and 3 show how the rolls according to the present invention are arranged forming an embossing group.

More specifically, the embossing group comprises two calenders with opposed rolls 20, 21 with parallel shafts. Each calender 20, 21 has the central shaft 12 and respectively a steel roll with an external rubber tubular jacket 22 and a rubber roll with an external tubular jacket 23, made of steel coated with rubber, between which a veil of paper 40 is passed. The steel roll 22 is incised, with outer protuberances and acts as a real embossing roll of the veil of paper 40 which passes into the calender 20, 21. A gluing group 41 feeds the glue that joins the two veils 40 treated by the embossing group.

In both cases, oscillating and non-rotating connection organs 15 are interposed, as already indicated, between the central shafts 12 and the tubular jacket 22 and 23, allowing the deformation of the shaft 12 to be compensated without significantly involving the respective jacket 22, 23.

The oscillating bearings 13 are positioned at the opposite ends of the shafts 12, some in seats (not shown) of the shoulders 17 of the structure and others in arms 18 hinged in 19 to the same structure and controlled by means of actuation cylinders 24 closing each calender 20, 21.

One of the shafts 12 extends into an appendix 25 for receiving the motion from a driving organ (not shown in FIGS. 2 and 3).

Figure 6:
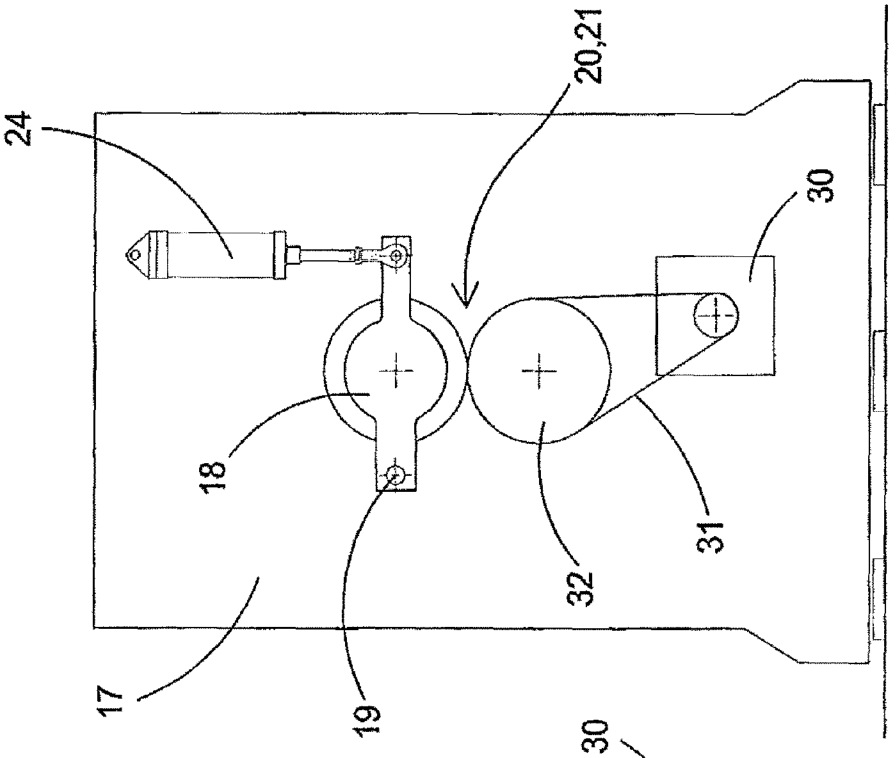
FIG. 6 shows a schematic raised side view of the arrangement shown in FIGS. 4 and 5.
Figure 4:
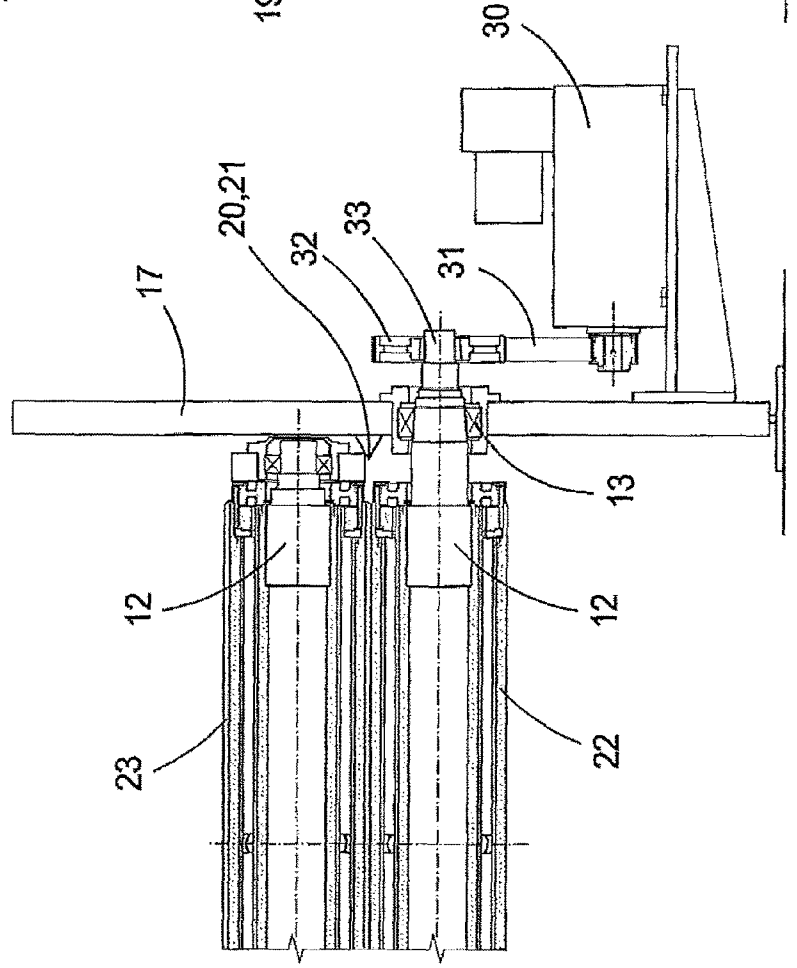
FIG. 4 shows a section of part of a pair of rolls forming an embossing calender such as those of the previous figures, illustrating a possible embodiment of a transmission between the parts.
Figure 5:
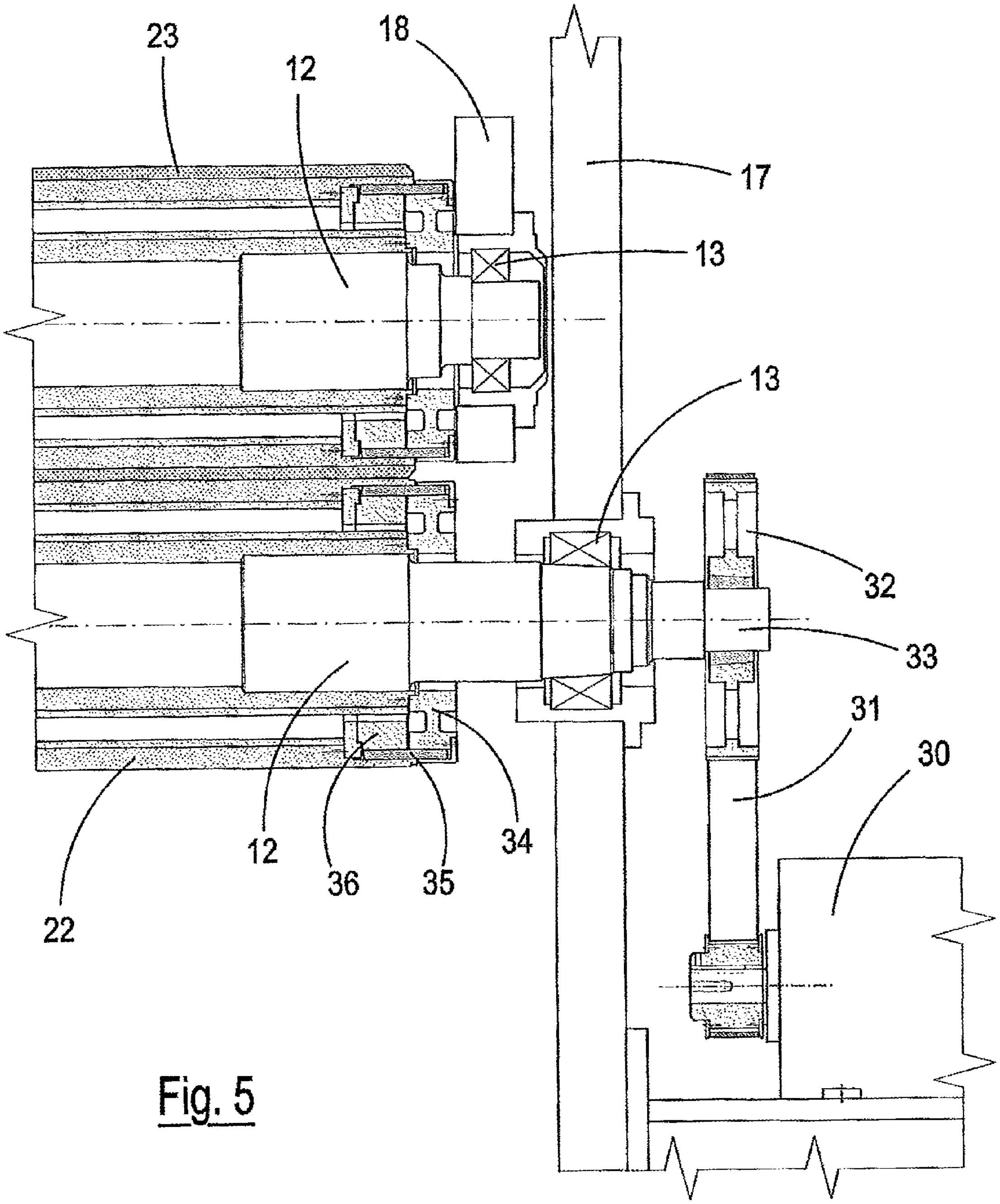
FIG. 5 shows an enlarged detail of FIG. 4.

FIGS. 4 to 6 show a sectional and raised side view of part of a pair of rolls forming an embossing calender 20, 21, such as those of the previous figures, in which a possible embodiment of a transmission between the parts is envisaged.

In particular, it is shown how the movement is transmitted from a motor reducer 30 by means of a belt 31 to a pulley 32 fitted on an appendix 33 of a shaft 12 situated on oscillating bearings 13 (only one of which is shown positioned in the shoulder 17).

As envisaged for the roll according to the invention described above, also in this embodiment, the central shaft 12 and respective tubular jackets are torsionally integral through joints or flexible organs, capable of transmitting a torque. In this specific case illustrated, these organs are produced as follows.

The shaft 12 is fitted with a toothed pulley 34 which interacts inside a toothed belt 35 positioned coaxially with respect to the shaft 12. The toothed belt 35 also houses a toothed pulley 36 which is integral with the tubular jacket 22 forming part of the steel roll. In this way, the shaft 12 and jacket 22 rotate integrally engaged through the toothed pulley 34 and toothed pulley 36 with the toothed belt 35 and producing joints or flexible organs, capable of transmitting a torque.

The same thing can be repeated for the rubber roll and for the respective shafts 12 and rubber tubular jacket 23. Also in this case, in fact, the arrangement is envisaged of a toothed pulley 34, a toothed belt 35 and a toothed pulley 36.

From this description, the functioning of the various elements and movement relation between the various parts are evident.

The figures also show the positioning of the oscillating and non-rotating organs 15 that compensate the deformation of the shaft 12.

The use of these rolls in an embossing group with two calenders such as that described and illustrated allows the deformation of the shaft 12 without significantly involving the jacket, which consequently undergoes only slight deformation even at the highest pressures, also eliminating the drawbacks associated with the known art WO-A-2009/010999.

When forming part of these embossing groups, the central shaft and jacket according to the invention are capable of transmitting an optimum torque, at the same time allowing a certain independence between central shaft and jacket.

With a roll according to the invention, further advantages are also obtained, such as:

elimination of skewing previously referred to with elimination of the drawbacks associated with this technique;

abolishment of the necessity of aligning the paper veils that the skewing device tends to misalign;

elimination of the continuous zeroing necessary for the rubber rolls that become worn due to the high coupling pressure values;

uniform wear over the whole table of the rubber roll.

It should also be remembered that the roll and device that uses this roll according to the invention, in addition to the advantages mentioned above, maintains its capacity of being installed on existing machines in substitution of traditional rolls, as it maintains their weights and dimensions.

The objective indicated in the preamble of the description has therefore been achieved.

The forms, as also the materials and assembly modes, of the structure for the production of a roll and device for the treatment of ribbon-shaped paper material using the roll of the invention can naturally differ from those shown for purely illustrative and non-limiting purposes in the drawings.

The protection scope of the present invention is therefore delimited by the enclosed claims.

The invention claimed is:

1. A roll for devices for treatment of ribbon-shaped paper material comprising:

a central shaft on which a coaxial tubular jacket is fitted; and two oscillating and non-rotating connection organs positioned between said central shaft and said jacket, the central shaft of the roll comprising, at opposite ends, oscillating bearings housed in a supporting structure, wherein said central shaft and jacket are both rotating and made torsionally integral by a flexible organ configured to transmit a torque, and wherein said flexible organ comprises a first toothed pulley coupled on said central shaft and a second toothed pulley integral with said tubular jacket both interacting inside a toothed belt positioned coaxially with respect to the shaft and to the first and the second toothed pulley.

2. The roll according to claim 1, wherein said tubular jacket is made of steel.

3. The roll according to claim 1, wherein said tubular jacket is made of steel coated with rubber.

4. The roll according to claim 1, wherein said flexible organ is an elastic joint.

5. A device for treatment of ribbon-shaped paper material comprising:

at least one pair of opposed rolls, each of the opposed rolls comprising:

a central shaft on which a coaxial tubular jacket is fitted; and two oscillating and non-rotating connection organs positioned between said central shaft and said jacket, the central shaft of the roll comprising, at opposite ends, oscillating bearings housed in a supporting structure, wherein said central shaft and jacket are both rotating and made torsionally integral by a flexible organ configured to transmit a torque, and wherein said flexible organ comprises a first toothed pulley coupled on said central shaft and a second toothed pulley integral with said tubular jacket both interacting inside a toothed belt positioned coaxially with respect to the shaft and to the first and the second toothed pulley.

6. The device according to claim 5, wherein a first roll of said pair is a roll with a steel tubular jacket and a second roll of said pair is a roll with a steel tubular jacket coated with rubber.

7. The device according to claim 6, wherein at least one shaft of said pair of rolls extends into an appendage onto which a third pulley is fitted, said third pulley being engaged with a belt rotated by a motor reducer.

8. The device according to claim 6, wherein both said first roll and said second roll are configured such that said flexible organ is an elastic joint.

* * * * *